United States Patent [19]

Frenken et al.

[11] Patent Number: 5,125,947
[45] Date of Patent: Jun. 30, 1992

[54] METHOD AND APPARATUS FOR PRODUCING CURVED GLASS SHEETS

[75] Inventors: Heinz-Josef Frenken, Stolberg; Manfred Borger, Aachen, both of Fed. Rep. of Germany

[73] Assignee: Saint-Gobain Vitrage International, Courbevoie, France

[21] Appl. No.: 642,789

[22] Filed: Jan. 18, 1991

[30] Foreign Application Priority Data

Jan. 19, 1990 [FR] France ............... 90 00592

[51] Int. Cl.⁵ ........................... C03B 23/035
[52] U.S. Cl. ........................ 65/106; 65/273; 65/287; 65/289
[58] Field of Search ......... 65/106, 114, 288, 286, 65/287, 289, 290, 273, 374.12

[56] References Cited

U.S. PATENT DOCUMENTS

| | | | |
|---|---|---|---|
| 3,389,984 | 6/1968 | Englehart et al. | 65/106 X |
| 3,473,909 | 10/1969 | Bennett et al. | 65/106 |
| 3,484,225 | 12/1969 | Bognar | 65/103 |
| 4,432,782 | 2/1984 | Seymour | 65/286 X |
| 4,738,704 | 4/1988 | Vanaschen et al. | 65/287 X |
| 4,764,196 | 8/1988 | Boutiev et al. | 65/106 |
| 4,906,271 | 3/1990 | D'Iribarne et al. | 65/273 |
| 4,983,205 | 1/1991 | Kuster | 65/290 |

FOREIGN PATENT DOCUMENTS 1553891 1/1969 France .
1559723 3/1969 France .

Primary Examiner—Robert L. Lindsay
Attorney, Agent, or Firm—Oblon, Spivak, McClelland, Maier & Neustadt

[57] ABSTRACT

A method and apparatus for curving a glass sheet is described in which a glass sheet is held by forces of a pneumatic nature against an upper element of dimensions smaller than those of the glass sheet. According to the invention, the parts of the glass sheet projecting beyond the upper element are held against a flexible material, the dimensions of which are greater than those of the glass sheet. The flexible material is interposed between the glass sheet and the upper element, and is secured so that portions of the flexible material which extend beyond the upper element are held in directions tangential to the surface of the upper element in its marginal zones. The invention is applicable, notably, to the production of automobile panes.

26 Claims, 1 Drawing Sheet

METHOD AND APPARATUS FOR PRODUCING CURVED GLASS SHEETS

BACKGROUND OF THE INVENTION

1. Field of the Invention

The present invention relates to a method and apparatus for producing curved glass sheets, which also may be toughened, notably for the production of automobile safety panes. More particularly, the present invention relates to methods in which the glass sheets are heated while flat in a straight-through horizontal furnace, are brought by a conveyor into a curving station, where they are stopped beneath an upper element, are raised and applied against this upper element, and are then released onto a lower element, for example of the frame type open at its center, the shaping of the glass sheets being carried out at least partly on this lower element, and then finally are brought into a cooling station, notably a thermal toughening station.

2. Discussion of the Background

Many examples of curving techniques are found in the technical literature. Notably, Patent Publications EP-A-3,391, FR-B-2,085,464, EP-A-240,418, EP-B 241,355, U.S. Pat. No. 4,682,997, all have in common the use of an upper element taking part in the transfer of the glass sheets from the conveyor which has brought the glass sheets through the furnace to a lower element which constitutes a shaping tool and/or a tool for transferring the glass sheets to the cooling station. Generally, the contact surface of the upper element with the glass sheet is covered with an intervening covering. This intervening covering softens the contact between glass and upper element, notably by a "smoothing" of the slight imperfections in the surface condition of the upper element which may subsist even after careful machining. Furthermore, this covering absorbs the dust particles sandwiched between the upper element and the glass sheet, which otherwise would leave their imprint on the relatively soft glass. Finally, this covering prevents pitting from forming on the hot glass, due to the difference in the nature of the materials constituting the upper element (for example, refractory steel) and the sheets treated (by definition, glass).

Numerous materials have been used as covering materials. Those most commonly used are fabrics of glass fibers or papers based upon silica and/or aluminum fibers agglomerated by a mineral binder. However, disadvantageously, these coverings must be replaced very frequently—especially if the glass panes comprise many enamelled zones, which cause the glass sheets to stick to the covering material, which results in the tearing away of the covering material in strips as the enamelled glass sheets are released from the upper element.

In another connection, "long-life" coverings have quite recently been proposed, based essentially on metallic fibres. In French Patent Application FR-A-2,606,398, a covering is disclosed in which the surface which contacts the glass is made of a mesh of knitted metallic wires. On the other hand, European Patent Application EP-A-31,439 discloses a basically metallic fabric possessing a thermal conductivity which preferably is less than 0.2 W m$^{-1}$ K$^{-1}$, formed of rovings of a plurality of elementary threads, disposed in different directions, together creating links or stitches and interfering to form knots at the tops of the stitches, as a result of which the stitches are indeformable.

These last-mentioned coverings wear less rapidly, even if they are brought into contact with enamelled panes having a tendency to stick, this sticking tendency being essentially linked with the nature itself of the enamelling compositions. However, independently of the materials used, the authors of the present invention have established that enamelled panes have an inferior optical quality as compared to that of panes that are identical in shape and size, but not enamelled, simply because of application against a rigid upper element.

To overcome this problem, a curving method is disclosed in European Patent Applications EP-A-240,418 and EP-A-241,355, according to which the glass sheet is raised and applied against the upper element by a suction resulting from a pressure reduction created in the vicinity of the periphery of the glass sheet, which projects beyond the upper element, because the face of the upper element, toward the conveyor against which the glass sheet is being applied, is advantageously of smaller dimensions than those of the applied face of the glass sheet. It is thus possible to arrange for the enamelled parts of the pane—which generally are along the edges so as to form a kind of frame—not to be applied against the upper element. Nevertheless, not all the difficulties are entirely eliminated in this way.

In fact, along the demarcation line separating the part of the glass sheet applied against the upper element from its non-applied part, the presence of deformations can be detected which result in optical defects which appear after the toughening. The applied areas do not behave in exactly the same way as the non-applied areas, although a full explanation of the mechanisms to which these differences in behavior can be attributed has not yet been found.

Thus, there remains a need for a method and apparatus for preparing curved glass sheets, which are free of the above-described drawbacks.

SUMMARY OF THE INVENTION

Accordingly, it is one object of the present invention to provide a novel method for producing curved glass sheets.

It is another object of the present invention to provide a novel apparatus for producing curved glass sheets.

It is another object of the present invention to provide a novel method and apparatus for curving a glass sheet using a multi-purpose upper element during the transfer of the glass sheets from the conveyor, which has brought them through the furnace, in which they have been reheated to their curving temperature, to a lower element, by means of which the shaping of the glass sheets is carried out or completed; the multi-purpose nature of the upper element being retained even if the glass sheets treated have enamelled zones of greater or lesser width along their edges and being achieved without the disadvantage of a deterioration in the optical quality of the panes produced.

These and other objects, which will become apparent during the following detailed description have been achieved by a method of curving a glass sheet, wherein the glass sheet is heated while flat in a horizontal straight-through furnace, is brought by conveyor into a curving station, where it is stopped beneath an upper element, the face of which towards the conveyor has smaller dimensions than those of the glass sheet; the hot glass sheet is raised above the conveyor and applied against the upper element by forces of a pneumatic nature, then released onto a lower element—the shaping of the glass sheet being carried out at least partly on this lower element—and is finally brought into a cooling station, notably a thermal toughening station. According to the invention, the parts of the glass sheet which project beyond the upper element are applied against a flexible material, the surface dimensions of which are greater than those of the glass sheet and which is held in contact with the surface of the upper element facing towards the glass sheet, and the portions of the flexible material which extend beyond the upper element are held in directions tangential to the surface of the upper element in its marginal zones.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE PREFERRED EMBODIMENTS

Figure 1:
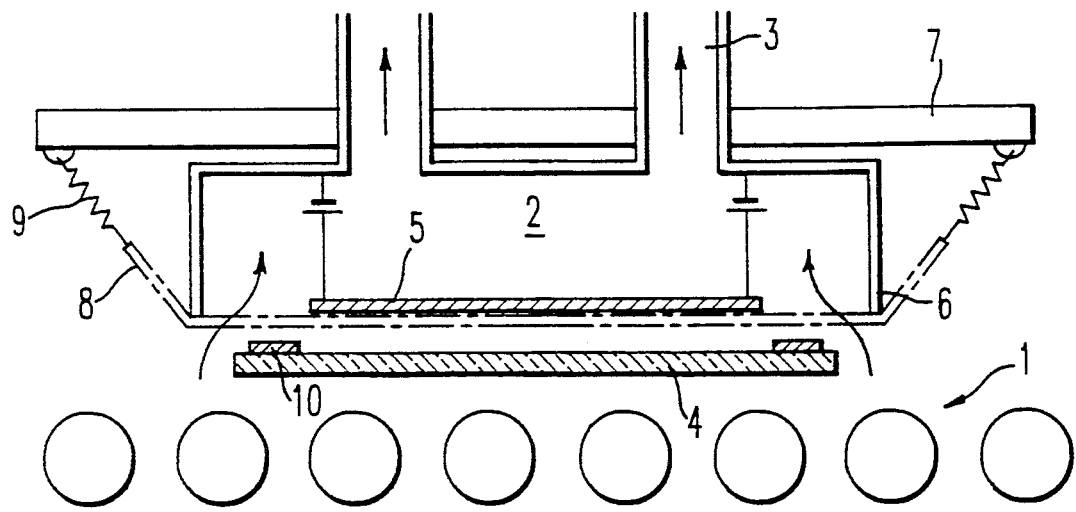
FIG. 1 shows a schematic view of an upper element surrounded by a depressurized chest entirely closed by a flexible material.

If the upper element is curved, the flexible material defines a kind of large upper element, the shape of which differs very slightly from the perfect form, because its marginal portions are of necessity straight. However, the upper elements used have relatively large radii of curvature, so that near the marginal zones their surfaces virtually merge with the tangent surfaces and this deviation is invisible on the finished product.

Of course the term "marginal zone" refers to the edge of the upper element. Thus, the portions of flexible material which extend beyond the upper element are held in directions which are tangential to the surface, facing toward the glass sheet, at the edge of the upper element.

The method of curving according to the present invention is therefore remarkable in that the glass sheet is partly applied solely against a flexible material without this material being in bearing against a rigid upper element. This flexible material moreover fulfills the function of a covering for its part in contact with the upper element. The pneumatic application forces for the glass sheet suitably are, for example, a suction caused by a sub-pressure created at the periphery of the glass sheet or a compression created by an ascending hot air flow. In the case of a suction, the sucked air must be capable of passing through the part of the covering which projects beyond the upper element, which therefore requires the use of a material permeable to air.

In a particularly notable manner, it has been found that merely the presence of the flexible covering is enough for rendering sufficiently uniform the treatment which all the parts constituting the glass sheet undergo, including therefore its peripheral part, so that the glass sheet finally does not exhibit any trace of having undergone such a differentiated treatment and no optical defect consequent upon this treatment appears after cooling, notably after cooling by thermal toughening. On the other hand, the presence of this flexible projecting covering does not in any way limit the versatility or other advantages expected of an upper element of dimensions smaller than the dimensions of the glass sheet, whatever the size of the glass sheets treated and whatever the width of any peripheral enamelled band forming, for example, a frame.

It is, however, self-evident that in the case of enamelled panes there is especially an advantage in choosing, for the material of the covering, a material which is more particularly well-adapted to a contact with the enamelling compositions. For example, the flexible material may comprise an essentially metallic fabric having a thermal conductivity less than $0.2 \ W \ m^{-1} \ K^{-1}$, preferably formed of rovings of a plurality of elementary threads, these rovings being disposed in different directions, together forming stitches or links and interfering to form knots at the tops of the stitches. It is also possible to use a felt or knitted material, without binder, of fibers of a refractory alloy having a diameter of from 8 to 16 microns, as the flexible material.

With advantage, this metallic fabric, felt or knitted material is itself covered with an anti-stick ceramic layer on the side facing towards the glass sheet. The ceramic layer can be chosen from, for example, a layer of zirconium dioxide, aluminum oxynitride, aluminum-silicon oxynitride or aluminum titanate.

The present invention also relates to an apparatus for curving a glass sheet comprising a horizontal straight-through furnace, a conveyor for bringing the glass sheet through this furnace and as far as a curving station, in which a vertically movable upper element is suspended above the conveyor, said upper element having a lower surface of dimensions smaller than those of the glass sheet, pneumatic means for causing the glass sheet to rise and to come into bearing against the upper element and a lower element adapted for receiving the glass sheet when the pneumatic means no longer apply the glass sheet against the upper element, the curving station comprising, in addition, fixing means for a flexible material, the dimensions of which are greater than those of the glass sheet, this material being tightly held outside the upper element in directions tangential to the surface of the upper element in its marginal zones.

According to one preferred embodiment, the curving station comprises a depressurized chest, surrounding the upper element which may be planar or very slightly curved with upward concavity, the opening section of the chest being of larger dimensions than the glass sheet and being entirely closed by a flexible material permeable to air. The glass sheet is thus held against the flexible covering, by suction through the flexible covering, which must therefore have a very high permeability to air in order not to perturb the suction mechanism as applied to the periphery of the glass sheet. With advantage, the material is fixed to the chest by spring-type attachments and may be removed from these attachments as rapidly as possible in order to facilitate its replacement.

Referring now to the drawings, wherein like reference numerals designate identical or corresponding parts throughout the several views and more particularly to FIG. 1 thereof, which is a highly schematic view of a curving station according to the present invention, which can be accommodated in known manner in a curving installation. The curving installation comprises, successively in the order of passage for a glass sheet, a charging station for the glass sheets onto a conveyor, a horizontal straight-through furnace in which the glass sheets are heated while being carried flat on the conveyor, and from which they emerge after having reached a temperature equal to their curving and/or toughening temperature, the curving station proper in which the temperature of the glass sheets is at least maintained constant, a cooling station (notably a thermal toughening station), and means for transferring the glass sheets from the curving station to the cooling station.

The glass sheets enter the curving station by a conveyor 1, for example, composed of a series of driven rollers 11.

The curving station shown comprises, essentially, a chest 2, connected by ducts 3 with a suction chamber, connected in turn to a suction device (not shown), which creates a sub-atmospheric pressure in the vicinity of the periphery of the glass sheet 4, so that this sheet is raised above the conveyor 1, and eventually, held against an upper element 5 covered by a flexible material 8. FIG. 1 shows the glass sheet in a transient state in which it is between conveyor 1 and flexible material 8. In the chest 2, there are mounted fixing rods, from which upper element 5, as shown a plate, preferably cut from a relatively thick sheet of stainless steel, is suspended. The upper element 5 is placed just at the limit of the chest 2, that is to say, the lower face of the upper element 5 is at the level of the horizontal plane defined by the lower edges 6 of the vertical walls of the chest 2. The chest 2—and with it also the upper element 5 suspended from it—is vertically movable, or more precisely, the frame 7 to which it is fixed can be displaced between two extreme positions, a low position in which the upper element 5 is only a few millimeters above the glass sheet 4 on the conveyor 1, and a high position such that the space between the glass sheet 4 pressed against the upper element 5 and the conveyor 1 is of sufficient height to allow the entry of a lower element, which receives the glass sheet when the upper element 5 releases it.

The bottom of the chest 2 is closed by a flexible material 8, which is fixed by spring attachments 9 to the frame 7, by being held with tension outside the upper element 5 in directions tangential to the surface of the upper element 5 in its marginal zones. As FIG. 1 shows, the present invention may be advantageously operated with a chest 2, the bottom of which is of larger dimensions than those of the treated glass sheets 4. In contrast, the upper element 5 is of dimensions clearly smaller than those of the glass sheets 4. Advantageously, the dimensions of the upper element 5 are so chosen that when a glass sheet of which the whole or a part of the edges are covered with a layer of enamelling 10 is offered up, this layer 10 is not opposite the upper element 5 but is solely opposite the flexible covering 8.

After the glass sheet 4 has been pressed against the upper element 5, this element is raised and there is introduced beneath the glass sheet 4 a lower element, preferably composed of a shaped frame open at its center, the curvature of which the softened glass sheet hugs under the effect of gravity. Depending upon the desired sharpness of the curvature to be imparted to the glass sheet, the glass sheet is moved either directly to the cooling station or to an intermediate pressing station for pressing against a solid, male upper curving mold, the lower element in the form of a frame serving as a female pressing mold. It should be noted that, if required, such pressing is possible, because it takes place several seconds after the glass sheet has entered the curving station and because this brief period of time is sufficient for the baking of certain enamelling compositions to be completed.

Figure 2A:
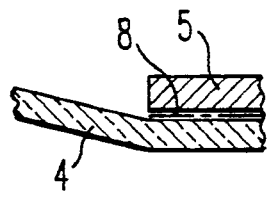
FIGS. 2(A) and 2(B) illustrate the behavior of the glass sheet at the limit of the upper element in the presence, 2(B), or absence, 2(A), of the flexible material.
Figure 2B:
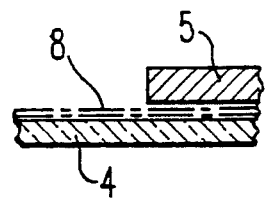

The optical quality of the panes produced in this manner is exceptionally good, independently of the relative positions of the enamelled bands and the upper element, and the fact that the entire surface of the glass sheet is held against the material. One explanatory hypothesis for this very surprising state of affairs has been established by the inventors from observations of the shaping mechanism carried out with a very high speed camera. As can be seen in FIG. 2(A), when the glass sheet comes into bearing against an upper element of smaller surface dimensions than its own, its unsupported edges have a slight tendency to continue their vertical travel, with the result that a fold forms. The fold is the origin of optical defects. With a flexible material covering projecting beyond the upper element according to the present invention as shown in FIG. 2(B), this upward movement of the edges of the glass sheet is prevented, but without these edges coming into bearing against the rigid upper element, which would degrade the enamelled band and cause optical defects if allowed to occur.

The metallic coverings developed as intermediate covering material for curving molds are more especially suitable for this invention. Mention may be made, for example, of the material disclosed in European Patent Application EP-A 312,439, incorporated herein by reference, composed of a fabric based upon metal threads of the refractory stainless steel type, the elementary threads of which are preferably of a diameter less than 10 microns, arranged in rovings of at least 90 threads, disposed in different directions, in such a way as to create preferably square stitches having at their tops knots which make them indeformable. The size of the stitches are chosen in such a way that the porosity to air shall preferably be greater than 95%.

It is also possible to use a felt or knitted fabric in conformity with the teachings of French Patent Application FR 89.03077, incorporated herein by reference, produced with fibers having a diameter, for example, of 8 to 16 microns and advantageously of the order of 12 microns, preferably based upon a refractory nickel alloy or a stainless steel, the fibers being assembled without binder. The felt or knitted fabric preferably has a weight per unit area of from 300 to 900 $g/m^2$, and its porosity is preferably from 95 to 98%.

With advantage, this covering is itself covered with a layer of anti-stick ceramic; i.e., a ceramic, to which the enamelling composition has a relatively low tendency to stick, and preferably chosen from among the following group of ceramics: zirconium dioxide, aluminum-silicon oxynitride, aluminum oxynitride and aluminum titanate.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of curving a glass sheet, comprising the sequential steps:
   (i) heating a flat glass sheet in a straight-through horizontal furnace;

(ii) applying said glass sheet against an upper element which has a surface toward said glass sheet having dimensions smaller than those of said glass sheet; and (iii) releasing said glass sheet into a lower element, wherein, during said apply step, the portions of said glass sheet which project beyond said upper element are applied against a flexible material with dimensions greater than those of said glass sheet by means of suction, wherein said flexible material is permeable to air and which is held in contact with said surface of said upper element facing toward said glass sheet and the portions of said flexible material which extend beyond the upper element are held in directions tangential to marginal zones of said surface of said upper element, and wherein at least a part of said curving is effected on said lower element.

2. The method of claim 1, further comprising:
(iv) cooling said glass sheet in a cooling station.

3. The method of claim 2, wherein said cooling station is a thermal toughening station.

4. The method of claim 1, wherein said applying is carried out by pneumatic means.

5. The method of claim 4, wherein said applying is carried out by means of suction through said flexible material.

6. The method of claim 4, wherein said applying is carried out by means of an ascending hot air flow.

7. The method of claim 1, wherein said upper element is planar.

8. The method of claim 1, wherein said upper element has a convex surface facing towards said glass sheet.

9. The method of claim 1, wherein said lower element is a shaping frame with an open center and a shape corresponding to the shape to be imparted to said glass sheet.

10. The method of claim 9, further comprising the step of replacing said upper element with a solid male mold.

11. The method of claim 1, wherein said flexible material has a porosity to air of at least 95%.

12. The method of claim 11, wherein said flexible material comprises a metallic fabric having a thermal conductivity of less than 0.2 W m$^{-1}$ K$^{-1}$.

13. The method of claim 12, wherein said flexible material comprises rovings of a plurality of elementary threads disposed in different directions, said rovings forming stitches, and forming knots at the tops of said stitches.

14. The method of claim 11, wherein said flexible material comprises a felt or a knitted material of refractory alloy fibers without binder, said refractory alloy fibers having a diameter of from 8 to 16 microns.

15. The method of claim 12, wherein said flexible material further comprises a layer of anti-stick ceramic directly transposed thereon.

16. The method of claim 15, wherein said anti-stick ceramic is selected from the group consisting of zirconium dioxide, aluminum-silicon oxynitride, aluminum oxynitride, and aluminum titanate.

17. An apparatus for curbing a glass sheet, comprising:

(a) conveyor means for carrying said glass sheet from a straight-through horizontal furnace to a curving station;

(b) said curving station comprising an upper element, a flexible material permeable to air covering the lower surface of said upper element, pneumatic means for holding the glass sheet to said flexible material covering said upper element; and (c) a lower element for receiving said glass sheet when said pneumatic means no longer applies said glass sheet to said flexible material covering said upper element;

wherein said upper element has smaller surface dimensions than said glass sheet, said flexible material has larger surface dimensions than said glass sheet, and the portions of said flexible material which extend beyond the lower furnace of said upper element are held in directions tangential to marginal zones of said surface of said upper element.

18. The apparatus of claim 17, wherein said upper element is mounted in a depressurized chest, and said flexible material is held against said lower surface of said upper element by spring means, said spring means being attached to said depressurized chest.

19. The apparatus of claim 17, wherein said flexible material has a porosity to air of at least 95%.

20. The apparatus of claim 19, wherein said flexible material is a metallic fabric having a thermal conductivity of less than 0.2 W m$^{-1}$ K$^{-1}$.

21. The apparatus of claim 20, wherein said metallic fabric comprises rovings of a plurality of metal threads disposed in different directions, said rovings forming stitches, and forming knots at the tops of the stitches.

22. The apparatus of claim 20, wherein said flexible material comprises a felt or a knitted fabric of refractory alloy fibers without binder, said refractory alloy fibers having a diameter of from 8 to 16 microns.

23. The apparatus of claim 22, wherein said flexible material has a layer of anti-stick ceramic transposed directed thereon.

24. The apparatus of claim 23, wherein said anti-stick ceramic is selected from the group consisting of zirconium dioxide, aluminum-silicon oxynitride, aluminum oxynitride and aluminum titanate.

25. The apparatus of claim 17, wherein said pneumatic means comprises vacuum-forming means.

26. The apparatus of claim 17, wherein said pneumatic means comprises an ascending air flow.

* * * * *